United States Patent
Ishikawa

(10) Patent No.: US 9,902,220 B2
(45) Date of Patent: Feb. 27, 2018

(54) TIRE MOUNTING DEVICE

(71) Applicant: Central Motor Wheel Co., Ltd., Anjo-Shi (JP)

(72) Inventor: Masanobu Ishikawa, Handa (JP)

(73) Assignee: Central Motor Wheel Co., Ltd., Anjo-Shi (JP)

( * ) Notice: Subject to any disclaimer, the term of this patent is extended or adjusted under 35 U.S.C. 154(b) by 247 days.

(21) Appl. No.: 14/763,961

(22) PCT Filed: Feb. 28, 2013

(86) PCT No.: PCT/JP2013/055291
§ 371 (c)(1),
(2) Date: Jul. 28, 2015

(87) PCT Pub. No.: WO2014/132376
PCT Pub. Date: Sep. 4, 2014

(65) Prior Publication Data
US 2015/0360526 A1    Dec. 17, 2015

(51) Int. Cl.
*B60C 25/135* (2006.01)
*B60C 25/132* (2006.01)
(Continued)

(52) U.S. Cl.
CPC .......... *B60C 25/12* (2013.01); *B60C 25/0503* (2013.01); *B60C 25/0563* (2013.01); *B60C 25/138* (2013.01); *B60C 25/0527* (2013.01)

(58) Field of Classification Search
CPC ... B60C 25/138; B60C 25/12; B60C 25/0503; B60C 25/0527; B60C 25/0563
(Continued)

(56) References Cited

U.S. PATENT DOCUMENTS 5,287,907 A * 2/1994 Kawabe ................ B60C 25/138
                                                                157/1
7,264,032 B2   9/2007 Peinelt et al.
(Continued)

FOREIGN PATENT DOCUMENTS

EP    1 630 010 A1    3/2006
JP    52-90803 U      7/1977
(Continued)

OTHER PUBLICATIONS

Extended European Search Report (Application No. 13876174.7) dated Sep. 21, 2016.
(Continued)

*Primary Examiner* — Bryan R Muller
(74) *Attorney, Agent, or Firm* — Burr & Brown, PLLC

(57) ABSTRACT

A bead guide includes a columnar portion having a cylindrical side surface, and a guide plate extending from a distal end of the columnar portion. Through rotation of the bead guide, an expansion bar rotation driving section selectively switches the bead guide between a first position at which the guide plate is retreated radially inwardly from an outer circumferential end of a wheel, and a second position at which at least a part of the guide plate protrudes radially outwardly from the outer circumferential end of the wheel. The bead guide is switched from the first position to the second position so that the guide plate is caused to enter below an upper bead.

6 Claims, 10 Drawing Sheets

(51) Int. Cl.
*B60C 25/12* (2006.01)
*B60C 25/05* (2006.01)
*B60C 25/138* (2006.01)

(58) Field of Classification Search
USPC .............................................. 157/1.22, 1.17
See application file for complete search history.

(56) References Cited

U.S. PATENT DOCUMENTS

| 7,584,775 | B2 * | 9/2009 | Nomura | ................ | B60C 25/138 |
| | | | | | 157/1.17 |
| 2008/0128091 | A1 | 6/2008 | Nomura | | |

FOREIGN PATENT DOCUMENTS

| JP | 57-158109 | A1 | 9/1982 |
| JP | 11-192823 | A1 | 7/1999 |
| JP | 2008-001298 | A1 | 1/2008 |
| JP | 4230505 | B2 | 2/2009 |

OTHER PUBLICATIONS

International Search Report and Written Opinion (Application No. PCT/JP2013/055291) dated May 14, 2013.

\* cited by examiner

TIRE MOUNTING DEVICE

BACKGROUND OF THE INVENTION

Field of the Invention

The present invention relates to a tire mounting device for fitting a tire bead onto a rim of a wheel.

Description of Related Art

Hitherto, there has been known a tire mounting device for fitting a tire bead onto a rim of a wheel by pressing a tire along a circumferential direction of the tire under a state in which the tire is temporarily engaged on the wheel in an oblique posture. For example, a tire mounting device proposed in Patent Literature 1 includes a tire bead press roller and a guide roller, which are caused to circle along a circumference of the wheel. Thus, the guide roller guides an end portion of the tire bead to an outer circumferential position of the wheel, while the tire bead press roller following the guide roller presses a side surface of the tire bead (sidewall) from above, thereby fitting the tire bead onto the rim.

Further, a tire mounting device proposed in Patent Literature 2 includes, instead of the above-mentioned guide roller, a bead guide plate formed into an arc shape to guide the tire bead to the outer circumferential position of the wheel while sliding the tire bead on a surface of the bead guide plate.

CITATION LIST

Patent Literature

Patent Literature 1: JP 11-192823 A
Patent Literature 2: JP 4230505 B2

SUMMARY OF INVENTION

The tire mounting device proposed in Patent Literature 1 slides the tire bead in contact with an outer-circumferential-side upper surface of the wheel. Accordingly, when a step is formed in a widthwise direction of the wheel on the outer-circumferential-side upper surface of the wheel (on a flange surface of the rim), the tire bead may be caught by the step to damage the tire bead. For example, when a distal end of a spoke protrudes from an outer circumferential surface of the wheel in the widthwise direction of the wheel, the protruding portion (corresponding to a height of the spoke) becomes the step so that the above-mentioned problem is liable to arise.

This problem does not arise when a lower bead (tire bead located at a lower portion of the tire that is set in the tire mounting device) is fitted in a first step of mounting the tire. The tire bead has a smooth front surface, and is formed to be curved inward. Accordingly, the front surface of the tire bead can be smoothly slid on the outer-circumferential-side upper surface of the wheel. Therefore, the above-mentioned problem does not arise when the lower bead is fitted as a step of sliding the front surface of the tire bead on the outer-circumferential-side upper surface of the wheel. On the other hand, a back surface of the tire bead (on a side in which high-pressure air is sealed) is not smooth, and an end of the back surface of the tire bead is formed into an acute shape. Accordingly, the end may be easily caught by the step on the outer circumference of the wheel. Therefore, this problem may arise when an upper bead (tire bead located at an upper portion of the tire that is set in the tire mounting device) is fitted.

Further, the tire mounting device proposed in Patent Literature 2 positions the bead guide plate along an inner side of an outer circumferential edge of the wheel, and causes the bead guide plate to run between the outer-circumferential-side upper surface of the wheel and the tire bead while circling. However, the bead guide plate may be incapable of satisfactorily entering a gap between the outer-circumferential-side upper surface of the wheel and the tire bead. In this case, the tire bead may be caught by the guide plate or caught by the step on the outer circumference of the wheel, which may lead to damage of the tire bead.

The present invention has been made in order to solve the above-mentioned problem, and has an object to provide a tire mounting device capable of satisfactorily fitting a tire bead onto a rim of a wheel.

In order to achieve the above-mentioned object, a tire mounting device according to the present invention is characterized in that the tire mounting device comprises:

a bead guide (50) for pushing an inner circumferential end of a bead of a tire (T) radially outwardly of a wheel (H) while the bead guide circles about a center axis of the wheel under a state in which the tire is temporarily engaged on the wheel, and a roller (62) for pressing the bead of the tire from above the tire while the roller circles about the center axis of the wheel to follow the bead guide the bead guide includes:

a columnar portion (51) having a cylindrical side surface; and a plate-like guide plate (52) extending from a distal end of the columnar portion radially outwardly of the columnar portion, the bead guide is arranged at a position at which a bottom surface (53) of the bead guide is opposed to an outer-circumferential-side upper surface of the wheel with an interval secured between the bottom surface and the outer-circumferential-side upper surface, the tire mounting device further comprises bead guide rotary position switching means (41, 90) for selectively switching, by rotating the bead guide, the bead guide between a first position at which the guide plate is retreated from an outer circumferential end of the wheel radially inwardly of the wheel, and a second position at which at least a part of the guide plate protrudes from the outer circumferential end of the wheel radially outwardly of the wheel, and the bead guide is switched from the first position to the second position so that the guide plate is caused to enter below the bead of the tire.

The tire mounting device according to the present invention comprises the bead guide and the roller, and causes the bead guide to circle about the center axis of the wheel under the state in which the tire is temporarily engaged on the wheel. In this manner, the bead guide pushes the inner circumferential end of the bead of the tire (hereinafter referred to as a tire bead) radially outwardly of the wheel. Further, the tire mounting device causes the roller to circle about the center axis of the wheel to follow the bead guide. Thus, the roller presses the tire bead from above to fit the tire bead onto the rim of the wheel. The bead guide includes the columnar portion having the cylindrical side surface, and the plate-like guide plate extending from the distal end of the columnar portion radially outwardly of the columnar portion. When the tire is mounted, the bead guide is arranged at the position at which the bottom surface of the bead guide is opposed to the outer-circumferential-side upper surface of the wheel with the interval secured between the bottom surface and the outer-circumferential-side upper surface of the wheel.

Through the rotation of the bead guide, the bead guide rotary position switching means selectively switches the bead guide between the first position at which the guide plate is retreated from the outer circumferential end of the wheel radially inwardly of the wheel, and the second position at which at least the part of the guide plate protrudes from the outer circumferential end of the wheel radially outwardly of the wheel. For example, the bead guide is provided to be rotatable about an axis of the columnar portion, and the bead guide rotary position switching means switches a rotary position of the bead guide between the first position and the second position.

When the rotary position of the bead guide is set at the second position, the guide plate protrudes radially outwardly from the outer circumferential end of the wheel. Therefore, when the bead guide is caused to circle about the center axis of the wheel, the tire bead can be pushed radially outwardly of the wheel by the cylindrical side surface of the columnar portion while the tire bead is slid on an upper surface of the guide plate. Further, the roller following the guide plate presses down the tire bead from above, to thereby drop the tire bead into the rim of the wheel. In this manner, the tire is mounted to the rim of the wheel.

Therefore, even when a step is formed by a spoke or the like on the outer-circumferential-side upper surface of the wheel, the tire bead is supported by the guide plate, and hence is not caught by the above-mentioned step. In order to obtain this effect, it is necessary to reliably arrange the guide plate below the tire bead. Thus, according to the present invention, the bead guide rotary position switching means switches the bead guide from the first position to the second position, thereby causing the guide plate to enter below the tire bead. Therefore, the guide plate can be caused to reliably enter below the tire bead. With this, unlike the related-art devices, the tire bead is not caught by the guide plate and the step on the outer circumference of the wheel so that damage of the tire bead can be prevented.

Further, the present invention has another feature in that, when a lower bead (TBD), which is the bead located in a lower portion of the tire temporarily engaged on the wheel, is mounted to a rim of the wheel, the bead guide is caused to circle about the center axis of the wheel under a state in which the bead guide is set at the first position, and that, when an upper bead (TBU), which is the bead located in an upper portion of the tire temporarily engaged on the wheel, is mounted to the rim of the wheel, the bead guide is caused to circle about the center axis of the wheel under a state in which the bead guide is set at the second position.

In general, the tire bead has a smooth front surface, and is formed to be curved inward. Further, an end of a back surface of the tire bead has an acute shape. Accordingly, the front surface of the tire bead can be smoothly slid on the outer-circumferential-side upper surface of the wheel, whereas, when the step is formed on the outer-circumferential-side upper surface of the wheel, the back surface of the tire bead may be easily caught by the step. When the lower bead is mounted to the rim of the wheel, the front surface of the lower bead is opposed to the outer-circumferential-side upper surface of the wheel, and hence the lower bead can be slid on the outer-circumferential-side upper surface of the wheel without using the guide plate. Accordingly, in the present invention, when the lower bead is mounted to the rim of the wheel, the bead guide is caused to circle about the center axis of the wheel under the state in which the bead guide is set at the first position. In this manner, the cylindrical side surface of the columnar portion of the bead guide pushes the inner circumferential end of the lower bead radially outwardly of the wheel, thereby being capable of fitting the lower bead onto the rim of the wheel. In this case, the lower bead falls into the rim by a self-weight, and hence pressing performed by the roller may be omitted.

On the other hand, when the upper bead is mounted to the rim of the wheel, the back surface of the upper bead is opposed to the upper surface of the wheel, and hence it is difficult to smoothly slide the upper bead on the outer-circumferential-side upper surface of the wheel. Accordingly, in the present invention, when the upper bead is mounted to the rim of the wheel, the bead guide is caused to circle about the center axis of the wheel under the state in which the bead guide is set at the second position. In this manner, the bead guide pushes the upper bead radially outwardly of the wheel while sliding the upper bead on the upper surface of the guide plate. At this time, the roller following the guide plate presses down the upper bead from above. Thus, the upper bead is slid out of the guide plate to be fitted onto the rim of the wheel. As a result, according to the present invention, it is possible to mount the tire bead to the rim of the wheel without damaging the tire bead.

The present invention has another feature in that, when the bead guide rotary position switching means switches the bead guide from the first position to the second position, the bead guide rotary position switching means rotates the bead guide about an axis of the columnar portion in a direction reverse to a circling direction of the bead guide.

According to the present invention, when the bead guide if switched from the first position to the second position, the bead guide is rotated about the axis of the columnar portion in the direction reverse to the circling direction of the bead guide. Accordingly, the guide plate enters a gap between the outer-circumferential-side upper surface of the wheel and the tire bead from a wide side to a narrow side of the gap. Therefore, the guide plate can be caused to smoothly enter the above-mentioned gap. With this, the guide plate can be satisfactorily arranged below the bead of the tire.

Further, the present invention has another feature in that the guide plate is formed to extend in an arc shape from the distal end of the columnar portion radially outwardly of the columnar portion, and that the guide plate extends in the arc shape in the same direction as a direction of rotating the bead guide when the bead guide if switched from the first position to the second position.

According to the present invention, the guide plate is formed to extend in the arc shape from the distal end of the columnar portion radially outwardly of the columnar portion. Further, the guide plate extends in the arc shape in the same direction as the direction of rotating the bead guide when the bead guide is switched from the first position to the second position. Accordingly, when the bead guide is switched from the first position to the second position, a distal end extending in the arc shape of the guide plate can be caused to enter the gap between the outer-circumferential-side upper surface of the wheel and the tire bead. Therefore, the guide plate can be caused to further smoothly enter the above-mentioned gap. Thus, the guide plate can be further satisfactorily arranged below the bead of the tire.

Further, the present invention has another feature in that the tire mounting device further includes tire lifting means (86) for lifting the tire to increase a vertical interval between the outer-circumferential-side upper surface of the wheel and the bead of the tire when the bead guide rotary position switching means switches the bead guide from the first position to the second position.

According to the present invention, when the bead guide is switched from the first position to the second position, the tire lifting means lifts the tire to increase the vertical interval between the outer-circumferential-side upper surface of the wheel and the tire bead. Therefore, the guide plate can be caused to further reliably enter the gap between the outer-circumferential-side upper surface of the wheel and the tire bead.

The present invention has another feature in that the bottom surface (53) of the bead guide is inclined so that a height of the bottom surface is increased as the bottom surface approaches a center of the wheel irrespective of a rotary position of the bead guide.

According to the present invention, the bottom surface of the bead guide is inclined so that the height of the bottom surface is increased as the bottom surface approaches the center of the wheel irrespective of the rotary position of the bead guide. Therefore, even when the outer-circumferential-side upper surface of the wheel swells radially toward the center of the wheel, the bead guide can be prevented from interfering with the swelling portion.

Note that, in the above description, for facilitating the understanding of the invention, the configurations of the invention corresponding to the embodiment are suffixed in parentheses with symbols used in the embodiment. However, the components of the invention are not intended to be limited to the embodiment as defined by the symbols

DETAILED DESCRIPTION OF THE INVENTION

Figure 1:
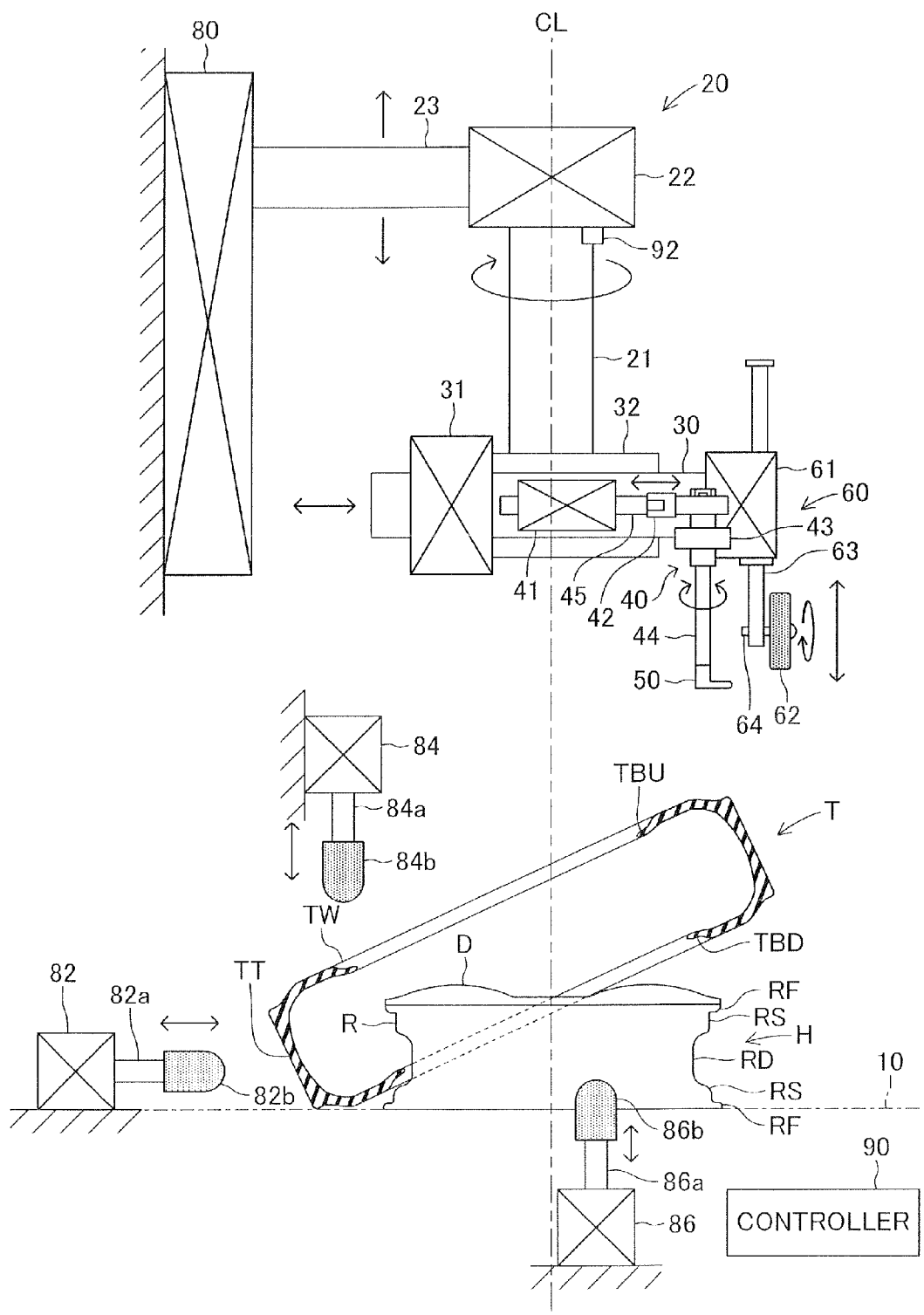
FIG. 1 is a schematic view for illustrating a configuration of a tire mounting device according to an embodiment of the present invention.

Now, an embodiment of the present invention is described with reference to the drawings. FIG. 1 is a schematic view for illustrating a configuration of a tire mounting device according to the embodiment of the present invention.

The tire mounting device according to this embodiment includes a table 10 for placing a wheel H on which a tire T is temporarily engaged in an oblique posture, a mounting unit 20 arranged above the table 10, for fitting a tire bead onto a rim R of the wheel H, a unit ascent-descent driving section 80 for moving the mounting unit 20 up and down, a tire horizontal press driving section 82 for horizontally pressing a tread of the tire T temporarily engaged on the wheel H, a tire vertical press driving section 84 for pressing down a sidewall of the tire T temporarily engaged on the wheel H from above the tire T, a tire lift driving section 86 for lifting up the tire T temporarily engaged on the wheel H from below the tire T, and a controller 90 for controlling operation of the tire mounting device.

The wheel H on which the tire T is temporarily engaged in an oblique posture (hereinafter referred to as the wheel H with a temporarily-engaging tire) is conveyed by a conveying device (not shown) onto the table 10, and is fixed by a clamping device (not shown) arranged on the table 10. The conveying device for conveying the wheel H with a temporarily-engaging tire, and the clamping device for fixing the wheel H with a temporarily-engaging tire to the table 10 do not provide a feature of the present invention, and do not have a difference from those of the related-art devices. Accordingly, illustration and description thereof are omitted.

The wheel H with a temporarily-engaging tire conveyed by the conveying device is placed and fixed onto the table 10 in a horizontal posture so that a design surface of the wheel H faces upward. In this case, in the tire T temporarily engaged on the wheel H in an oblique posture, a tire bead formed along an inner circumferential end of an upper sidewall is referred to as an upper bead TBU, and a tire bead formed along an inner circumferential end of a lower sidewall is referred to as a lower bead TBD. When the upper bead TBU and the lower bead TBD are not distinguished from each other, the tire bead is simply referred to as a tire bead TB. Under a state in which the tire T is temporarily engaged on the wheel H in an oblique posture, as illustrated in FIG. 1, the lower bead TBD is held in contact with an outer circumferential end of the wheel H on the design surface side at two positions.

A center axis CL of the wheel H fixed to the table 10 is hereinafter referred to as a device center axis CL, and a position on the device center axis CL in a plane is hereinafter referred to as a device center O. The device center axis CL is directed vertically.

The wheel H is integrally formed of a cylindrical rim R as a portion onto which the tire T is to be fitted, and a disk D to be connected to a hub of a vehicle. On both widthwise sides of the rim R, flanges RF for supporting side surfaces of the tire bead TB are respectively formed. On an inner side of each of the flanges RF, a bead seat portion RS on which the tire bead TB is to be seated is formed. At a widthwise center of the rim R, a drop portion RD (also referred to as a well portion) as a cylindrical portion having a smallest diameter is formed. When the tire T is mounted to the wheel H, the drop portion RD functions as a region into which a part of the tire bead TB is temporarily inserted. With this configuration, an opposite part (radially opposed part) of the tire bead TB is easily fitted onto the rim R.

The mounting unit 20 includes a center shaft 21, a shaft rotation driving section 22 for rotating the center shaft 21 about an axis of the center shaft 21, a slide arm 30 mounted to a distal end of the center shaft 21, an arm back-and-forth movement driving section 31 for moving the slide arm 30 back and forth along an axial direction of the slide arm 30 to adjust a horizontal position of the slide arm 30, an expansion section 40 fixed to the slide arm 30, and a roller retaining section 60 similarly fixed to the slide arm 30.

The center shaft 21 is a bar-like body extending vertically so that a center axis of the center shaft 21 is aligned with the device center axis CL. The shaft rotation driving section 22 includes, for example, a motor and a reduction gear, and rotates the center shaft 21 about the axis of the center shaft 21. A casing of the shaft rotation driving section 22 is connected to the unit ascent-descent driving section 80 through intermediation of a lifting arm 23. The unit ascent-descent driving section 80 is fixed to a device main body frame (not shown), and is configured to move the lifting arm 23 up and down. As the unit ascent-descent driving section 80, for example, there may be adopted a well-known driving mechanism such as a mechanism including a screw feeding mechanism or a rack and pinion mechanism, for converting rotary motion of the motor into linear motion of the lifting arm 23, or a mechanism for moving the lifting arm 23 up and down using a hydraulic cylinder. When the lifting arm 23 is moved up and down by the unit ascent-descent driving section 80, the shaft rotation driving section 22 is moved up and down along with the lifting arm 23. Thus, the entire mounting unit 20 is moved up and down. In this manner, it is possible to adjust a vertical position of a bead guide 50 described later. Therefore, the unit ascent-descent driving section 80 is used for adjusting the vertical position of the bead guide 50.

Note that, as driving sections described later, which perform reciprocating motion in an axial direction (the tire horizontal press driving section 82, the tire vertical press driving section 84, the arm back-and-forth movement driving section 31, an expansion bar rotation driving section 41, and a roller ascent-descent driving section 61), a driving mechanism for converting rotary motion of the motor into linear motion, a hydraulic cylinder, or the like may be used similarly to the unit ascent-descent driving section 80.

The slide arm 30 is mounted to a distal end of the center shaft 21. The slide arm 30 is mounted to be slidable horizontally along a guide 32 fixed to the distal end of the center shaft 21. The guide 32 is a quadrangular tubular body extending horizontally and having an open front surface. The slide arm 30 is slidably held in the guide 32. The arm back-and-forth movement driving section 31 is fixed to the guide 32, and is configured to move the slide arm 30 back and forth in an axial direction (horizontal direction) of the slide arm 30.

The expansion section 40 and the roller retaining section 60 are mounted to the slide arm 30. The expansion section 40 is mounted to a front surface of the slide arm 30 exposed from the guide 32. Further, the roller retaining section 60 is mounted to a distal end of the slide arm 30. The expansion section 40 includes the expansion bar rotation driving section 41, a link mechanism 42, a bar support portion 43, and an expansion bar 44. The expansion bar rotation driving section 41 is fixed to the slide arm 30, and moves back and forth an output shaft 45 in a direction parallel to an axis of the slide arm 30. The bar support portion 43 is fixed to the slide arm 30, and supports the expansion bar 44 so that the expansion bar 44 is rotatable about an axis of the expansion bar 44. The link mechanism 42 converts back-and-forth movement of the output shaft 45 of the expansion bar rotation driving section 41 into rotary motion of the expansion bar 44. The link mechanism 42 rotates the expansion bar 44 in a first direction along with forward movement of the output shaft 45 of the expansion bar rotation driving section 41, and rotates the expansion bar 44 in a second direction reverse to the first direction along with backward movement of the output shaft 45 of the expansion bar rotation driving section 41. Note that, a driving mechanism for rotating the expansion bar 44 may be implemented by a motor and a reduction gear.

Figure 2:
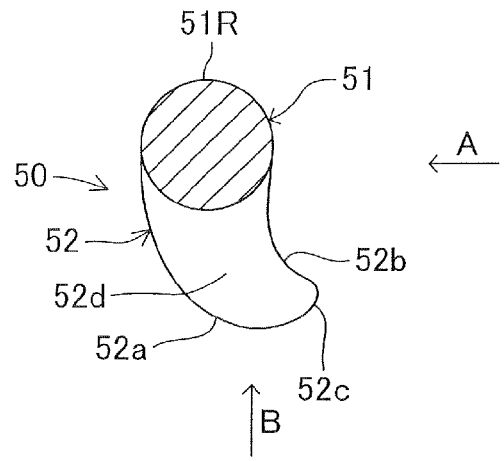
FIG. 2 is a partial sectional plan view for illustrating a bead guide.
Figure 3:
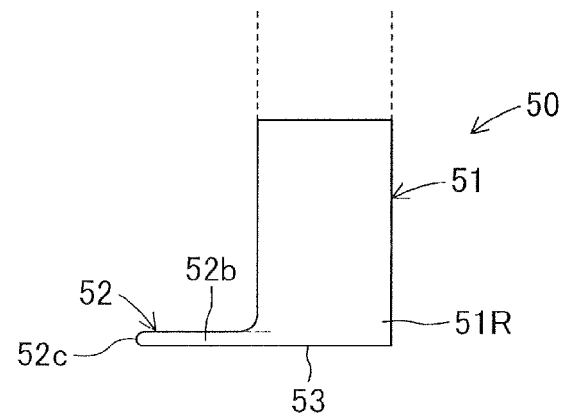
FIG. 3 is a side view for illustrating the bead guide as seen from the arrow "A" direction of FIG. 2.
Figure 4:
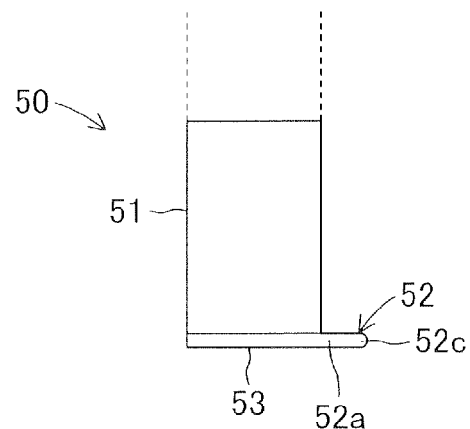
FIG. 4 is a front view for illustrating the bead guide as seen from the arrow "B" direction of FIG. 2.

The expansion bar 44 is rotatably supported by the bar support portion 43, and a rotary position of the expansion bar 44 about the axis of the expansion bar 44 is adjusted by the expansion bar rotation driving section 41. The expansion bar 44 is a cylindrical metal bar extending downward, and includes the metal bead guide 50 fixed to a lower distal end of the expansion bar 44. FIG. 2 is a partial sectional plan view for illustrating the bead guide 50. FIG. 3 is a side view for illustrating the bead guide 50 as seen from the arrow "A" direction of FIG. 2. FIG. 4 is a front view for illustrating the bead guide 50 as seen from the arrow "B" direction of FIG. 2. The bead guide 50 is integrally formed of a columnar portion 51 having a cylindrical side surface, and a spatula-shaped guide plate 52 formed at a lower end of the columnar portion 51. The guide plate 52 is a plate extending from a distal end of the columnar portion 51 radially outward in an arc shape, and has a bottom surface as a flat surface orthogonal to a center axis of the columnar portion 51. The bottom surface of the guide plate forms a flat surface continuous with a bottom surface of the columnar portion 51 as an end portion of the columnar portion 51. A continuous flat surface formed of the bottom surface of the guide plate 52 and the bottom surface of the columnar portion 51 is hereinafter referred to as a guide-portion bottom surface 53.

The guide plate 52 includes a first arc-shaped outer circumferential portion 52a that forms an arc-shaped outer circumference having a large radius of curvature, a second arc-shaped outer circumferential portion 52b that is curved in the same direction as the direction of the curvature of the first arc-shaped outer circumferential portion 52a and forms an arc-shaped outer circumference having a radius of curvature smaller than the radius of the curvature of the first arc-shaped outer circumferential portion 52a, an arc-shaped distal outer circumferential portion 52c connecting the first arc-shaped outer circumferential portion 52a and the second arc-shaped outer circumferential portion 52b to each other, and a center portion 52d surrounded by the outer circumferential portions. The guide plate 52 is shaped having a curved surface to smooth distal ends of the outer circumferential portions 52a, 52b, and 52c. Further, a corner portion at which the guide plate 52 and the columnar portion 51 are integrally connected to each other is also shaped having a curved surface. The guide plate 52 does not extend radially from an entire circumference of the columnar portion 51, but extends radially outward from a part of an outer circumference of the columnar portion 51. A cylindrical side surface of the columnar portion 51 on a side without the guide plate 52 is hereinafter referred to as a rounded portion 51R.

The bead guide 50 is fixed and mounted to a distal end of the expansion bar 44. Accordingly, the expansion bar 44 is rotated by the expansion bar rotation driving section 41, thereby changing an extending direction of the guide plate 52 from the columnar portion 51.

Figure 5:
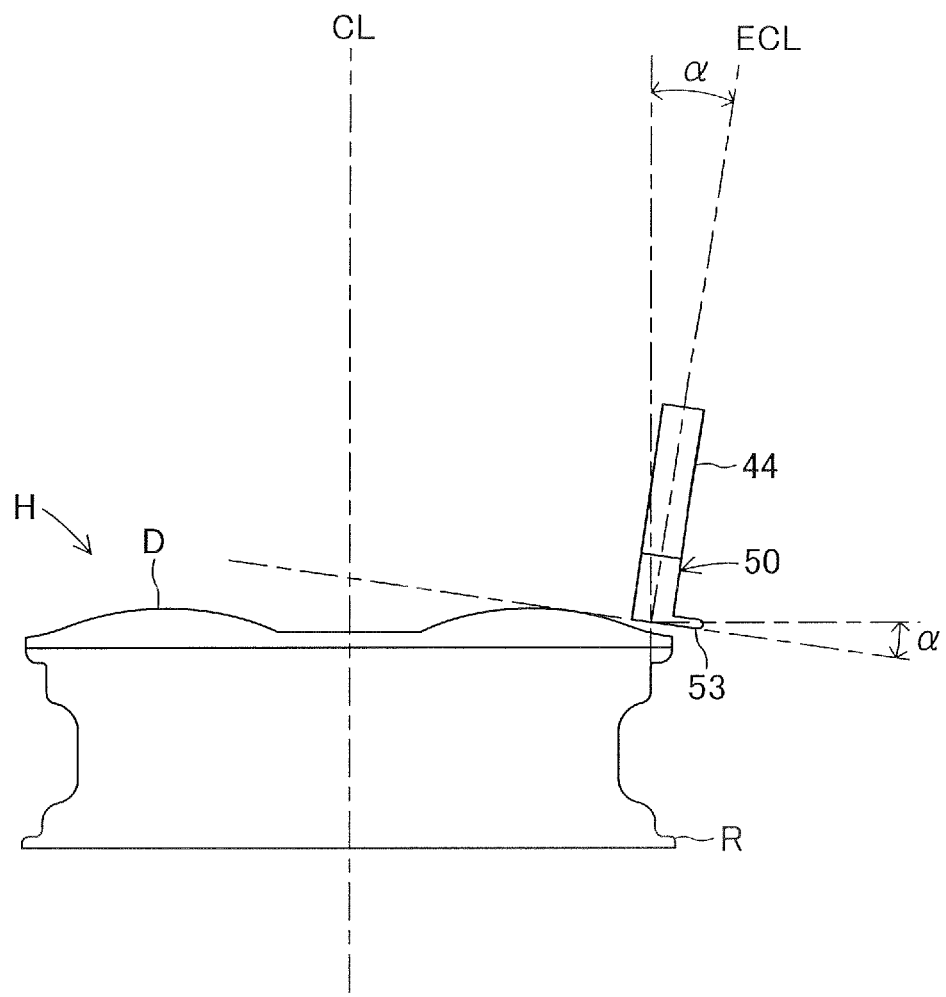
FIG. 5 is an explanatory view for illustrating inclination of an expansion bar.

As illustrated in FIG. 5, the expansion bar 44 is arranged so that an axial direction of the expansion bar 44 is inclined at a predetermined angle α with respect to the device center axis CL. In other words, a center axis ECL of the expansion bar 44 is inclined at the predetermined angle α so that a plane including the center axis ECL of the expansion bar 44 and the device center axis CL extends in a vertical direction, and that a distance from the expansion bar 44 to the device center axis CL is increased as the center axis ECL approaches an upper portion of the expansion bar 44.

Accordingly, in the bead guide 50 arranged coaxially with the expansion bar 44, the guide-portion bottom surface 53 is inclined at the predetermined angle α with respect to a horizontal plane irrespective of a rotary position of the expansion bar 44 (the guide-portion bottom surface 53 is inclined so that a height of the guide-portion bottom surface 53 is increased as the bottom surface 53 approaches radially toward the center of the wheel H).

The roller retaining section 60 includes the roller ascent-descent driving section 61 and a roller 62. The roller ascent-descent driving section 61 is fixed to the distal end of the slide arm 30, and is configured to move an output shaft 63 up and down in the vertical direction. The roller 62 is formed having a disk-like shape, and is rotatably mounted to the output shaft 63 of the roller ascent-descent driving section 61 through intermediation of a rotation support shaft 64. The rotation support shaft 64 is arranged in a horizontal posture toward the device center O. In FIG. 1, a side surface of the roller 62 as a pressing surface is illustrated. A front of the roller 62 exhibits a circular shape.

Figure 6:
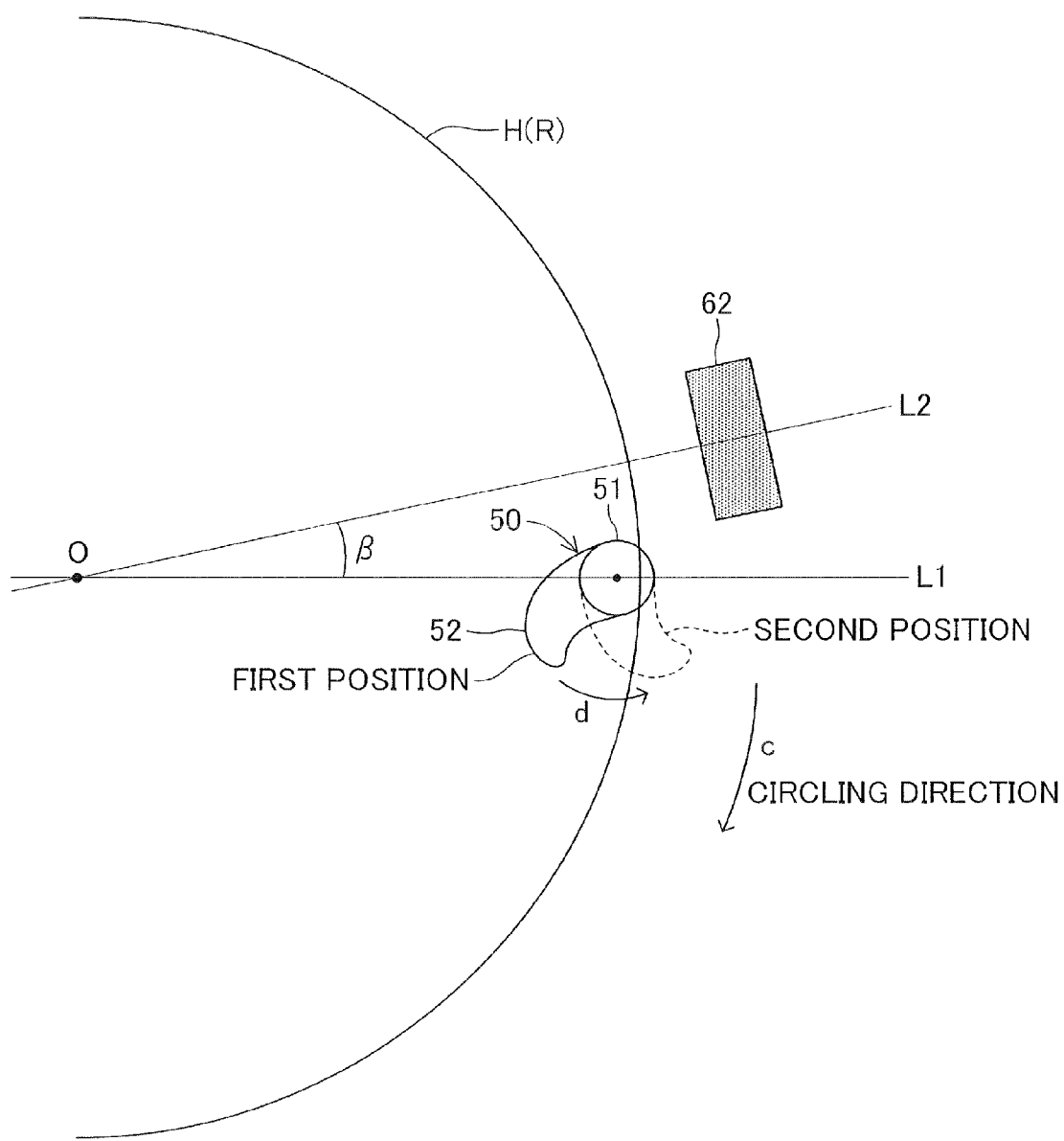
FIG. 6 is an explanatory view for illustrating a rotary position of the bead guide.

In the above-mentioned mounting unit 20, the unit ascent-descent driving section 80 and the arm back-and-forth movement driving section 31 set a radial position (radial position with respect to the device center O) of the bead guide 50 and a vertical position of the bead guide 50 so that the bead guide 50 is opposed to the outer circumferential portion of the wheel H with a temporarily-engaging tire. In this case, as illustrated in FIG. 6, the radial position of the bead guide 50 is set at such a position that a portion of the distal end of the columnar portion 51, which is farthest from the device center O in a radial direction (hereinafter referred to as an outermost cylindrical surface), protrudes slightly radially outward from the outer circumferential end of the wheel H (radially outer ends of the flanges RF). In other words, a distance from the device center O to the outermost cylindrical surface is set slightly larger than an outer diameter of the wheel H (an outer diameter of the rim R).

When the tire T is mounted, the center shaft 21 is rotated in a predetermined direction, thereby causing the bead guide 50 to circle about the device center axis CL in the arrow "c" direction of FIG. 6. Accordingly, the radial position of the bead guide 50 is set in the above-mentioned manner, and hence a track of movement of the outermost cylindrical surface of the circling bead guide 50 exhibits a circle having a diameter slightly larger than a diameter of the outer circumference of the wheel H.

Note that, in this embodiment, the radial position of the bead guide 50 is set at such a position that the outermost cylindrical surface protrudes slightly radially outward from the outer circumferential end of the wheel H. However, the radial position of the bead guide 50 may be set at such a position that the outermost cylindrical surface is aligned with the outer circumferential end of the wheel H (the distance from the device center O to the outermost cylindrical surface is equalized with the outer diameter of the rim R of the wheel H).

Further, the vertical position of the bead guide 50 is set at such a position that the guide-portion bottom surface 53 is opposed to an outer-circumferential-side upper surface of the wheel H with a predetermined gap. In this case, when recesses and projections extending in a widthwise direction of the wheel are formed of spokes or the like on the outer-circumferential-side upper surface of the wheel H, the vertical position of the bead guide 50 is set at such a position that the predetermined gap is formed with reference to the highest projection. The predetermined gap is set in order to bring the guide-portion bottom surface 53 close to the outer-circumferential-side upper surface of the wheel H while preventing contact with the outer-circumferential-side upper surface of the wheel H. Thus, the predetermined gap has a slight length.

The radial position of the bead guide 50 with respect to the device center O is set based on a back-and-forth movement position of the slide arm 30. Therefore, through operation of the arm back-and-forth movement driving section 31, the radial position of the bead guide 50 can be set at a position corresponding to a wheel diameter. Further, the vertical position of the bead guide 50 is set based on an ascent-descent position of the center shaft 21. Therefore, through operation of the unit ascent-descent driving section 80, the vertical position of the bead guide 50 can be set at a position corresponding to a width dimension of the wheel H (width dimension set in consideration of the recesses and projections).

Next, a position of the roller 62 is described. Both the expansion section 40 and the roller retaining section 60 are fixed to the slide arm 30, and hence the roller 62 circles integrally with the bead guide 50 when the center shaft 21 is rotated. In other words, the roller 62 circles while keeping a constant relative positional relationship with the bead guide 50 in a circumferential direction, a radial direction, and a height direction. The roller 62 presses down the tire bead TB as described later. A radial positional relationship between the roller 62 and the bead guide 50 is set so that a radial distance from the device center O to an inner circumferential end of a lower end portion of the roller 62 to be brought into contact with the tire T is larger than the radial distance from the device center O to the outermost cylindrical surface of the bead guide 50. Therefore, based on the above-mentioned radial positional relationship, a track of the inner circumferential end of the circling roller 62 exhibits a circle having a diameter larger than a diameter of a track of the outermost cylindrical surface of the circling bead guide 50. Further, a circumferential position of the roller 62 is set so that the roller 62 circles while following the bead guide 50. In other words, as illustrated in FIG. 6, assuming a straight line L1 horizontally connecting the device center O and a center of the bead guide 50 to each other, and a straight line L2 horizontally connecting the device center O and a rotation center of the roller 62 to each other, the straight line L1 is positioned on a forward side in a circling direction with respect to the straight line L2, and an angle formed by both the straight lines L1 and L2 is set to a predetermined angle β.

Further, the vertical position of the roller 62 is freely adjusted by the roller ascent-descent driving section 61. Through the adjustment of the vertical position of the roller 62, the roller 62 can be positioned at a height corresponding to the width of the wheel H. Thus, when the tire is mounted, the tire bead TB can be properly pressed by the lower end of the roller 62.

Next, rotation of the bead guide 50 is described. The expansion bar 44 is rotated by the expansion bar rotation driving section 41, thereby rotating the bead guide 50 about the center axis of the columnar portion 51 as a rotation axis. Thus, the extending direction of the guide plate 52 from the columnar portion 51 is changed. The rotary position of the bead guide 50 can be switched between a first position indicated by the solid line of FIG. 6 and a second position indicated by the broken line of FIG. 6. At the first position, the guide plate 52 is retreated radially inwardly from the outer circumferential end of the wheel H (an outer circumferential line of the rim R). At the second position, a part of the guide plate 52 protrudes radially outward from the outer circumferential end of the wheel H. At the second position, the first arc-shaped outer circumferential portion 52a of the guide plate 52 is positioned on the forward side in the circling direction with respect to the second arc-shaped outer circumferential portion 52b of the guide plate 52. The circling direction refers to the circling direction of the bead guide 50 and the roller 62 when the tire T is mounted.

Further, when switched from the first position to the second position, the bead guide 50 is rotated in a direction reverse to the circling direction. Therefore, the bead guide 50 is rotated in a direction in which the guide plate 52 extends in an arc shape. In this embodiment, as seen from above, the bead guide 50 and the roller 62 circle clockwise (in the arrow "c" direction of FIG. 6) along the outer circumference of the wheel H. Therefore, when switched from the first position to the second position, the bead guide 50 is rotated counterclockwise (in the arrow "d" direction of FIG. 6) as seen from above. Further, when switched from the second position to the first position, the bead guide 50 is rotated in a direction reverse to the direction at the time of switching the bead guide 50 from the first position to the second position, that is, rotated in the circling direction.

The tire horizontal press driving section 82 is arranged to be opposed to a lowermost region of the tire T temporarily engaged on the wheel H in an oblique posture. The tire horizontal press driving section 82 moves an output shaft 82a back and forth in the horizontal direction toward the device center O. When the output shaft 82a is moved forward, a pressing member 82b mounted to a distal end of the output shaft 82a presses a tread TT of the lowermost region of the tire T temporarily engaged in an oblique posture.

The tire vertical press driving section 84 moves an output shaft 84a up and down in the vertical direction. When the output shaft 84a is moved downward, a pressing member 84b mounted to a distal end of the output shaft 84a presses down a specific portion of a sidewall TW of the tire T from above. After completion of fitting of the lower bead TBD described later, the tire vertical press driving section 84 is operated to drop a specific portion of the upper bead TBU into the drop portion RD in cooperation with the tire horizontal press driving section 82. In this embodiment, the tire vertical press driving section 84 presses the sidewall TW at a position above the region of the tread TT pressed by the tire horizontal press driving section 82.

The tire lift driving section 86 moves an output shaft 86a up and down in the vertical direction. When the output shaft 86a is moved upward, a lifting member 86b mounted to a distal end of the output shaft 86a lifts up one portion of the sidewall TW of the tire T from below. When the rotary position of the bead guide 50 is switched after completion of fitting of the lower bead TBD described later, the tire lift driving section 86 is operated to enable the guide plate 52 to easily enter below the upper bead TBU.

The controller 90 controls operation of the driving sections 22, 31, 41, 61, 80, 82, 84, and 86 to sequentially execute preset processes. The controller 90 proceeds with the processes based on a rotation angle (rotary position) of the mounting unit 20. Hence, a rotation angle sensor 92 for detecting a rotation angle (rotary position) of the center shaft 21 is connected to the controller 90. As the rotation angle sensor 92, for example, an encoder may be used.

Next, a tire mounting step is described. The tire mounting step is roughly classified into a lower bead fitting step and an upper bead fitting step. After the wheel H with a temporarily-engaging tire is conveyed by the conveying device onto the table 10, the clamping device is operated by the controller 90 to fix the wheel H at a predetermined position. The clamping device is arranged, for example, on an inner side of the rim R of the wheel H, and is configured to press an inner circumferential surface of the rim R in a direction of increasing a diameter of the rim R, thereby fixing the wheel H at the device center. In this state, the tire T is merely temporarily engaged on the wheel H in an oblique posture, and hence it is necessary to insert the lower bead TBD of the tire T into the drop portion RD of the rim R. Accordingly, the controller 90 first operates the tire horizontal press driving section 82 to press the tread TT of the lowermost region (corresponding to a reference position described later) of the tire T. In this manner, the lower bead TBD of the tire T on the pressed side reliably enters the drop portion RD. At this time, about two thirds of the lower bead TBD are positioned above an upper surface (design surface) of the wheel H, that is, are not dropped into the rim R. Further, the entire circumference of the upper bead TBU is positioned above the upper surface of the wheel H.

Figure 7:
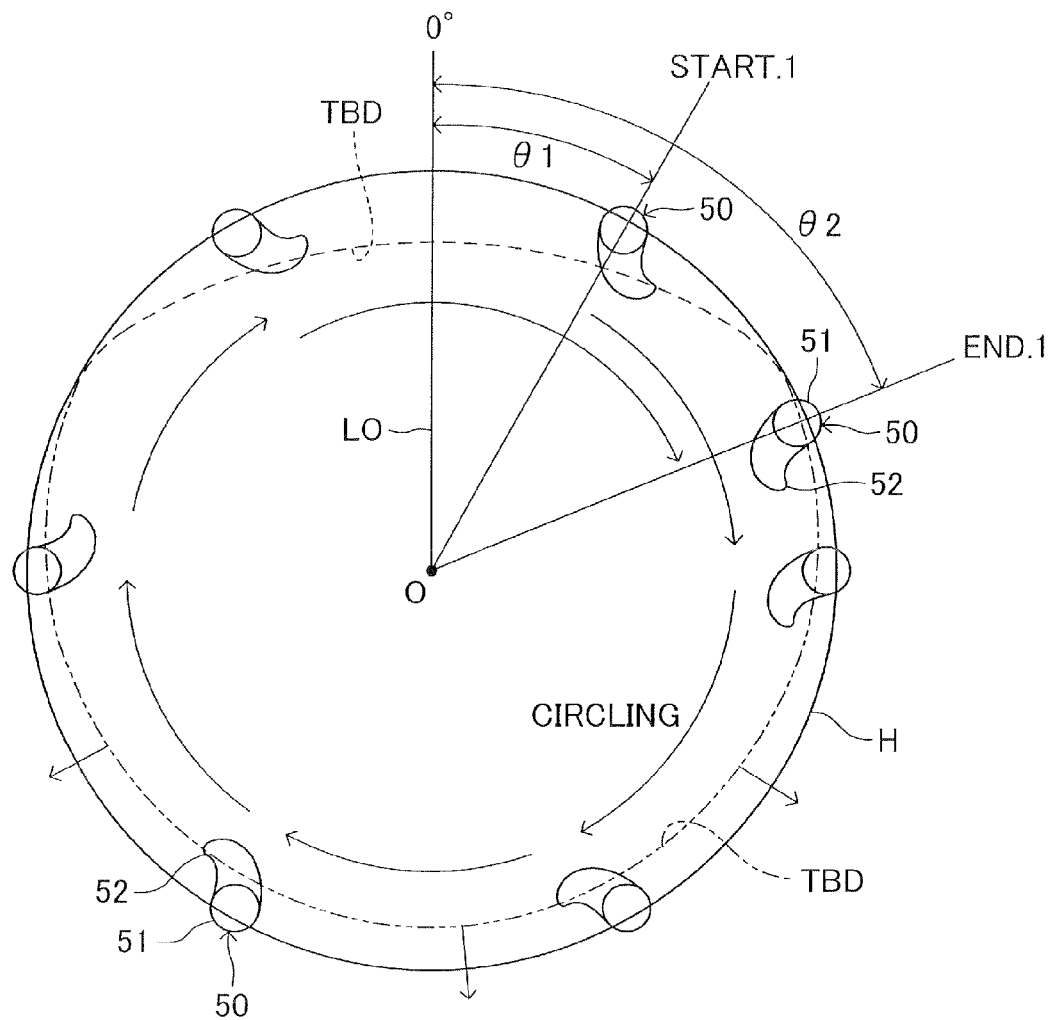
FIG. 7 is an explanatory view for illustrating circling of the bead guide in a lower bead fitting step.

From this state, the controller 90 starts the lower bead fitting step. A position at which the bead guide 50 starts circling at the start of the lower bead fitting step is set to a first initial position START.1. As illustrated in FIG. 7, the first initial position START.1 corresponds to a position turned from the reference position clockwise by an angle θ1. An angle indicating a circling position of the bead guide 50 is represented by an angle (clockwise rotation angle) formed between a line connecting the device center O and a center of the bead guide 50 to each other and a reference line L0 connecting the device center O and a reference position to each other, the reference position being a lowermost position of the tire T temporarily engaged on the wheel H in an oblique posture. Also in a case of specifying the circumferential positions of the tire T and the wheel H, description is hereinafter made with reference to the above-mentioned angle. In FIG. 7, the broken line indicates an inner circumferential line of the lower bead TBD received in the rim R of the wheel H, and the two-dot chain line indicates an inner circumferential line of the lower bead TBD remaining out of the rim R of the wheel H. Both the broken line and the two-dot chain line indicate the inner circumferential lines at the start of the lower bead fitting step. In the lower bead fitting step, the lower bead TBD remaining out of the rim R of the wheel H (the lower bead TBD positioned above the outer-circumferential-side upper surface of the wheel H) is dropped into the rim R.

The unit ascent-descent driving section 80 is operated by the controller 90 to lower the mounting unit 20 retreated at an upper position, to thereby arrange the bead guide 50 at a predetermined height. Thus, the guide-portion bottom surface 53 is opposed to the outer-circumferential-side upper surface of the wheel H with a predetermined interval secured between the bottom surface 53 and the outer-circumferential-side upper surface of the wheel H. Further, as described above, the radial position of the bead guide 50 is set at such a position that the outermost cylindrical surface of the bead guide 50 protrudes slightly radially outward from the outer circumferential end of the wheel H. Further, the rotary position of the bead guide 50 is set to the first position. Note that, the roller 62 is not used in the lower bead fitting step. Therefore, the roller 62 is arranged at an upper retreated position at which the roller 62 is not held in abutment on the tire T.

Figure 8:
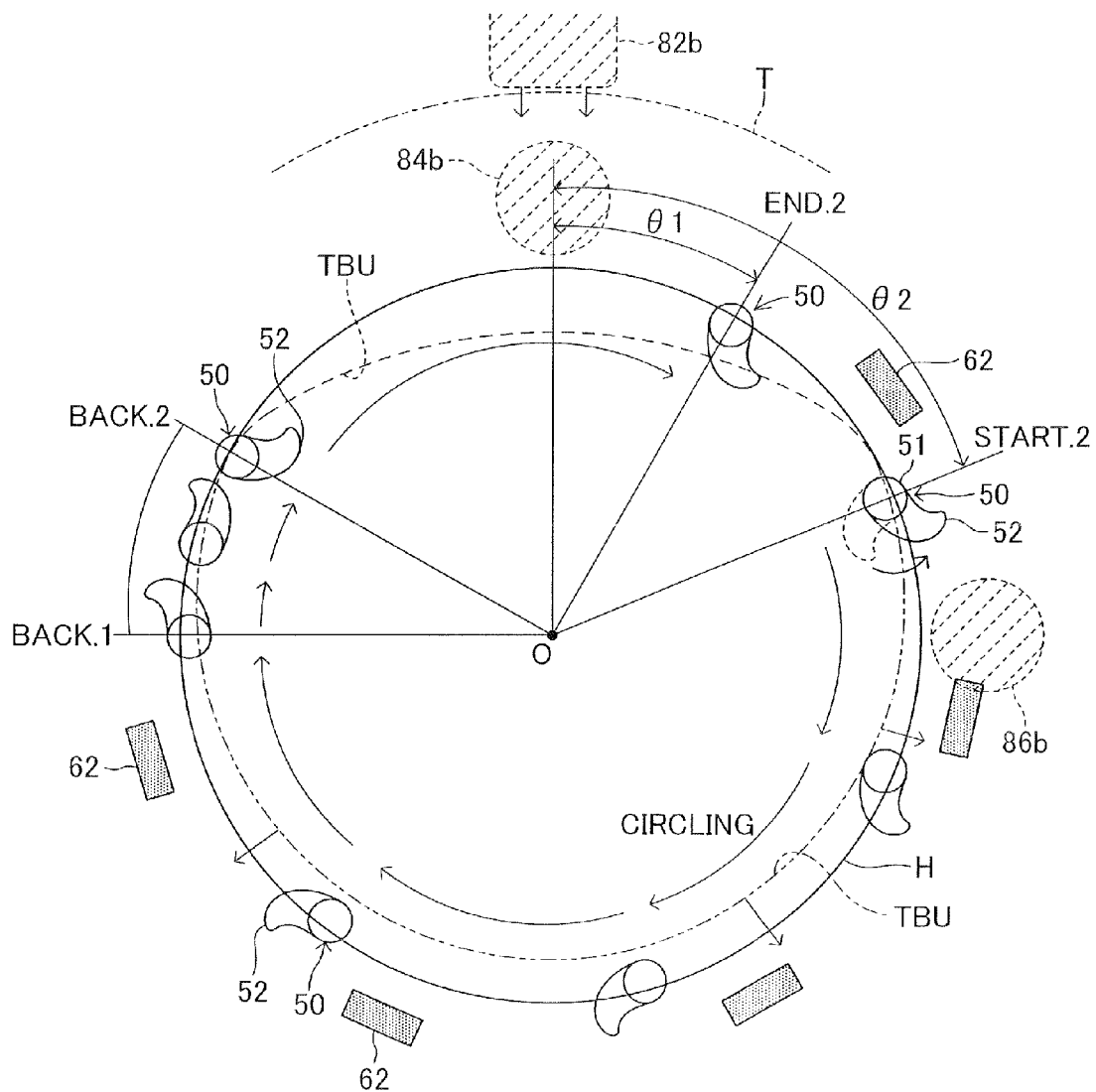
FIG. 8 is an explanatory view for illustrating circling of the bead guide in an upper bead fitting step.
Figure 9:
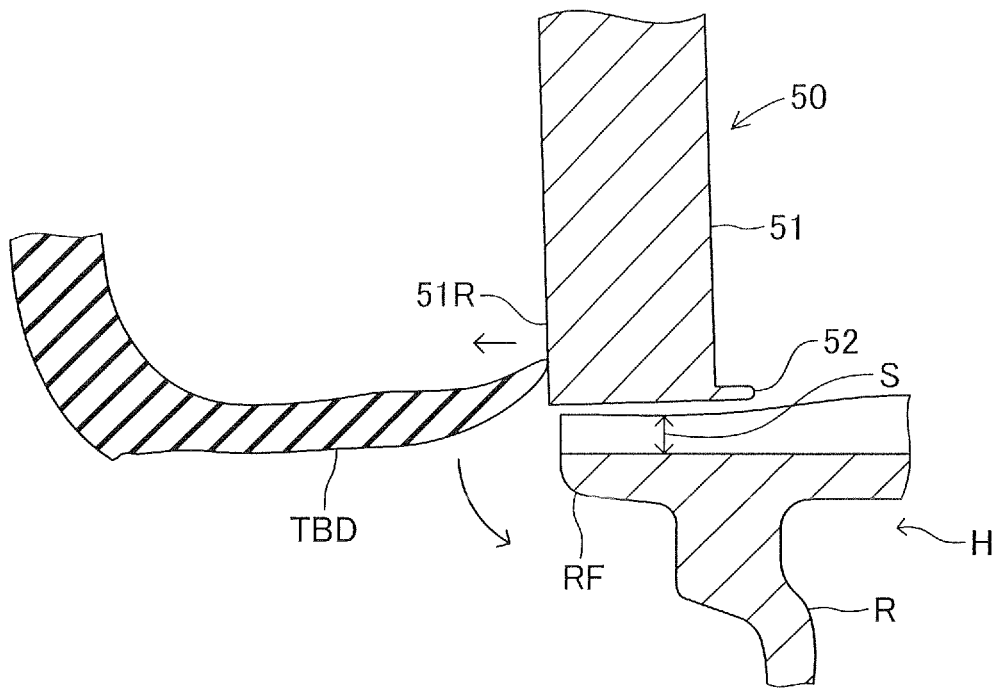
FIG. 9 is an explanatory view for illustrating a function of the bead guide in the lower bead fitting step.

At the first initial position START.1, the lower bead TBD of the tire T temporarily engaged on the wheel H is dropped into the rim R. From this state, the controller 90 operates the shaft rotation driving section 22 to rotate the center shaft 21 clockwise. Thus, the bead guide 50 starts circling clockwise. In the midst of circling, the rounded portion 51R of the bead guide 50 is brought into abutment on the inner circumferential end of the lower bead TBD that is not dropped into the rim R, and as illustrated in FIG. 9, the rounded portion 51R pushes the lower bead TBD radially outwardly of the wheel. Note that, in FIGS. 7 and 8, the plurality of bead guides 50 are illustrated, but this illustration is made in order to illustrate a track of the circling bead guide 50. Actually, the plurality of bead guides 50 are not arranged in the circumferential direction as illustrated in FIGS. 7 and 8. Further, the bead guide 50 is not caused to circle intermittently.

The tire bead TB has a smooth front surface, and is formed to be curved inward. Accordingly, when the lower bead TBD is subject to a force of pushing the lower bead TBD in the radial outward direction of the wheel from the rounded portion 51R of the bead guide 50, the lower bead TBD can smoothly slide on the outer-circumferential-side upper surface and an outer circumferential end surface of the wheel H. Therefore, as illustrated in FIG. 9, even when a step S is formed by a spoke or the like on the outer-circumferential-side upper surface of the wheel H, the lower bead TBD is pushed radially outwardly of the wheel without being caught by the step S, and then falls into the rim R by a self-weight.

Circling of the bead guide 50 causes the lower bead TBD to drop into the rim R in succession along the circumferential direction. Dropping of the lower bead TBD into the rim R is completed in the midst of circling of the bead guide 50. The controller 90 keeps the bead guide 50 circling as it is even after dropping of the lower bead TBD is completed. Then, when the bead guide 50 reaches a first end position END.1 beyond the first initial position START.1, the controller 90 stops the operation of the shaft rotation driving section 22. In this manner, the lower bead fitting step is finished. Note that, in the midst of circling of the bead guide 50, the controller 90 stops the operation of the tire horizontal press driving section 82, to thereby cancel pressing of the tire T.

Next, the upper bead fitting step is started. At the point in time when the lower bead fitting step is finished, the entire circumference of the upper bead TBU is positioned above the outer-circumferential-side upper surface of the wheel H. Accordingly, at the start of the upper bead fitting step, a process of fitting a part of the upper bead TBU onto the rim R is performed. In this case, the controller 90 operates the tire vertical press driving section 84 to cause the pressing member 84b to press down the sidewall TW from above at the reference position. From this state, the controller 90 operates the tire horizontal press driving section 82 to cause the pressing member 82b to press the tread TT radially inwardly of the wheel. In FIG. 8, positions of the tire pressed by the two pressing members 82b and 84b are indicated by reference symbols of the pressing members 82b and 84b.

In this manner, in a range around the reference position, the upper bead TBU is fitted onto the rim R. The inner circumferential line of the upper bead TBU in this state is illustrated in FIG. 8. In FIG. 8, the broken line indicates the inner circumferential line of the upper bead TBU received in the rim R, and the two-dot chain line indicates the inner circumferential line of the upper bead TBU remaining out of the rim R of the wheel H.

At this time, the circling position of the bead guide 50 corresponds to the first end position END.1 at which the bead guide 50 is located at the end of the lower bead fitting step. Therefore, a second initial position START.2, which corresponds to an initial position of the bead guide 50 in the upper bead fitting step, is the same as the first end position END.1. In this case, the upper bead TBU of the tire T is received in the rim R at a position closer to the reference position than the second initial position START.2. Therefore, at the second initial position START.2, the upper bead TBU of the tire T is positioned above the outer-circumferential-side upper surface of the wheel H.

From this state, the controller 90 switches the bead guide 50 from the first position to the second position. In other words, at the second initial position START.2, the expansion bar rotation driving section 41 is operated to rotate the expansion bar 44 up to the second position at which the distal end of the guide plate 52 protrudes outward from the outer circumferential line of the rim R. Thus, as illustrated in FIG. 8, the distal end of the guide plate 52 is rotated counterclockwise, thereby entering a gap between the outer-circumferential-side upper surface of the wheel H and the upper bead TBU. Therefore, the guide plate 52 can be caused to enter below the upper bead TBU.

Before operating the expansion bar rotation driving section 41, the controller 90 operates the tire lift driving section 86 to lift up the tire T. This operation is performed in order to increase the gap between the outer-circumferential-side upper surface of the wheel H and the upper bead TBU at the second initial position START.2. In this case, the tire lift driving section 86 lifts up the sidewall TW of the tire T at such a position that the upper bead TBU can be lifted up satisfactorily at the second initial position START.2. In FIG. 8, a position of the sidewall TW pushed up by the lifting member 86b of the tire lift driving section 86 is indicated by reference symbol of the lifting member 86b. In this case, while the controller 90 continues the above-mentioned operation of the tire horizontal press driving section 82 and the tire vertical press driving section 84, the controller 90 operates the tire lift driving section 86. Therefore, the tire T can be stably lifted up without causing the upper bead TBU on the reference position side to slip out of the rim R.

When the controller 90 switches the bead guide 50 from the first position to the second position, as illustrated in FIGS. 6 and 8, the controller 90 rotates the bead guide 50 about the axis of the columnar portion 51 counterclockwise. In other words, the controller 90 rotates the bead guide 50 in a direction reverse to the circling direction of the bead guide 50. On the other hand, the vertical gap between the outer-circumferential-side upper surface of the wheel H and the upper bead TBU becomes wider from the second initial position START.2 to the forward side in the circling direction. Accordingly, when the bead guide 50 is rotated from the first position to the second position, the guide plate 52 enters the vertical gap between the outer-circumferential-side upper surface of the wheel H and the upper bead TBU from a wide side of the vertical gap. Therefore, the guide plate 52 can be caused to reliably enter the gap between the outer-circumferential-side upper surface of the wheel H and the upper bead TBU. In addition, the guide plate 52 is formed into an arc shape extending in a direction of rotating the bead guide 50, and hence the distal end extending in an arc shape of the guide plate 52 can be caused to enter the gap between the outer-circumferential-side upper surface of the wheel H and the upper bead TBU.

When the controller 90 switches the bead guide 50 to the second position, the controller 90 retreats the lifting member 86b of the tire lift driving section 86, thereby stopping pushing up the sidewall TW.

Subsequently, the controller 90 operates the roller ascent-descent driving section 61 to lower the roller 62 to a preset height position. The height position is lower by a predetermined distance than a height of the outer-circumferential-side upper surface of the wheel H so that the upper bead TBU can be properly pressed by the lower end of the roller 62. Further, the radial position of the roller 62 with respect to the device center O is set to a position located outward of the outer circumferential end of the wheel H.

Figure 10:
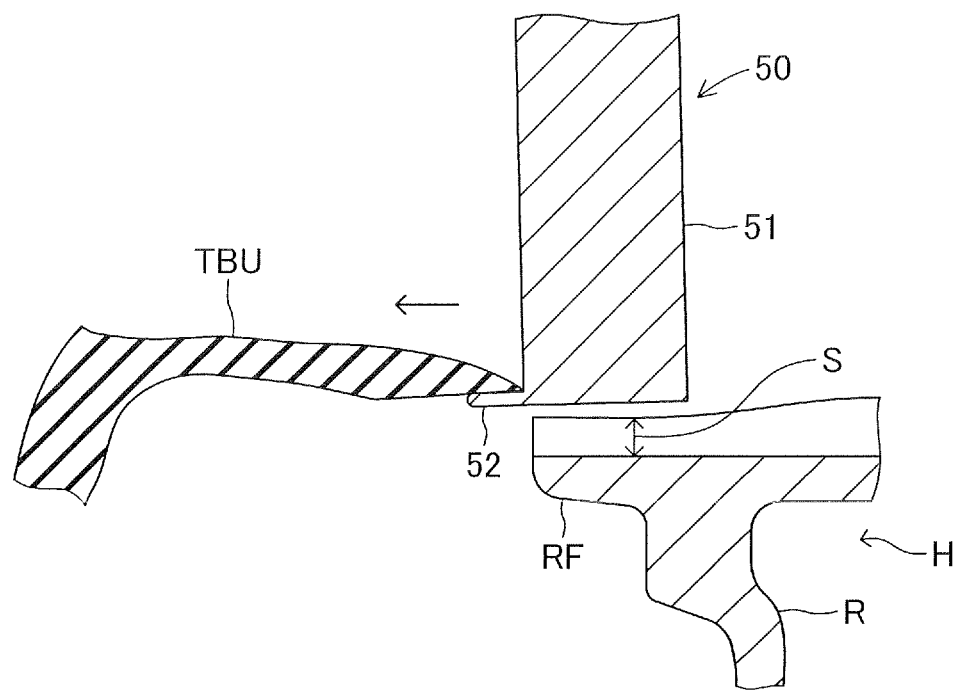
FIG. 10 is an explanatory view for illustrating a function of the bead guide in the upper bead fitting step.
Figure 11:
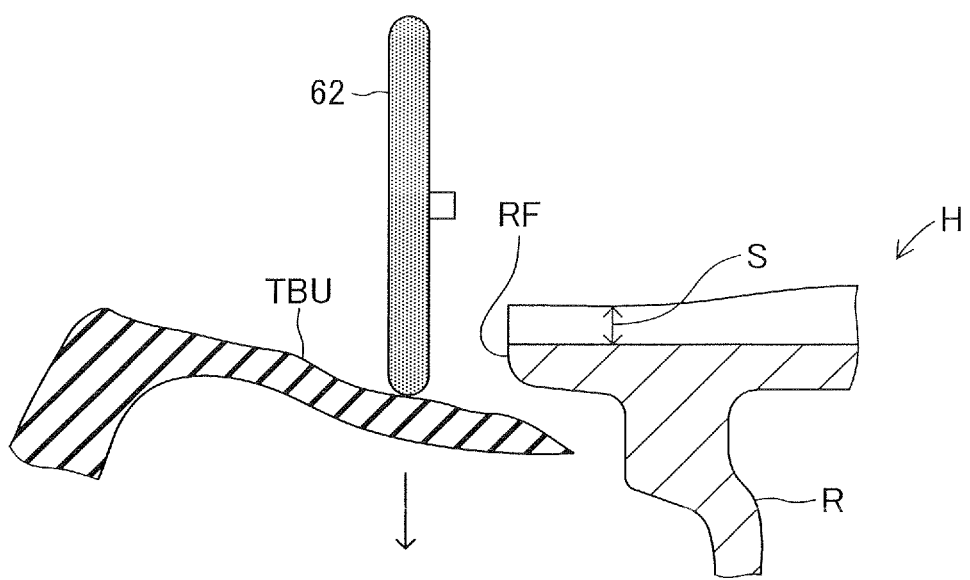
FIG. 11 is an explanatory view for illustrating a function of a roller in the upper bead fitting step.

From this state, the controller 90 operates the shaft rotation driving section 22 to rotate the center shaft 21 clockwise. In this manner, the bead guide 50 and the roller 62 integrally start circling clockwise. In this case, the bead guide 50 runs ahead of the roller 62. While the bead guide 50 and the roller 62 circle, the roller 62 presses down the upper bead TBU from above, but the guide plate 52 protrudes radially outward from the outer circumferential end of the wheel H. Thus, a back surface of the upper bead TBU can be placed and supported on the upper surface of the guide plate 52. Accordingly, as illustrated in FIG. 10, the back surface of the upper bead TBU is not pressed onto the outer-circumferential-side upper surface and the outer circumferential end of the wheel H, but slides on the upper surface of the guide plate 52. Further, an end of the upper bead TBU is pushed radially outward by the cylindrical side surface of the columnar portion 51. The upper bead TBU pushed radially outward is also pressed down by the roller 62 at a portion behind the pressed portion (on the backward side in the circling direction). Thus, as illustrated in FIG. 11, the upper bead TBU slides on the upper surface of the guide plate 52 to fall into the rim R. Therefore, even when the step S is formed by a spoke or the like on the outer-circumferential-side upper surface of the wheel H, the upper bead TBU can be smoothly fitted onto the rim R without being caught by the step S.

Circling of the bead guide 50 and the roller 62 causes the upper bead TBU to be fitted onto the rim R in succession along the circumferential direction. Further, as illustrated in FIG. 8, when the circling position of the bead guide 50 reaches a switchback start position BACK.1 at which fitting of the upper bead TBU is nearly completed, the controller 90 switches the rotary position of the bead guide 50 from the second position back to the first position. In this case, the controller 90 operates the expansion bar rotation driving section 41 while the controller 90 keeps the bead guide 50 and the roller 62 circling. In this manner, the bead guide 50 is switched to the first position at the point in time when the circling position of the bead guide 50 reaches a switchback end position BACK.2. Through the operation of switching the bead guide 50 back to the first position, the upper bead TBU, which has been already fitted onto the rim R, can be prevented from being lifted up and detached from the rim R by the guide plate 52.

When the circling position of the bead guide 50 almost reaches the switchback end position BACK.2, the entire circumference of the upper bead TBU has been fitted onto the rim R. When the circling position of the bead guide 50 reaches a second end position END.2, the controller 90 stops the operation of the shaft rotation driving section 22. Note that, while the bead guide 50 and the roller 62 circle, when the bead guide 50 and the roller 62 reach a set circling position at which it is assumed that the entire circumference of the upper bead TBU has been fitted onto the rim R, the controller 90 operates the unit ascent-descent driving section 80 to raise the mounting unit 20, and also operates the roller ascent-descent driving section 61 to retreat the roller 62 upward.

In this manner, the upper bead fitting step is finished. At this time, the circling position of the bead guide 50 is located at the second end position END.2, and the second end position END.2 corresponds to the first initial position START.1. Therefore, at the time of mounting a subsequent tire, it is not necessary to turn the mounting unit 20 to the first initial position START.1.

As described above, the tire mounting device according to this embodiment includes the bead guide 50 on which the guide plate 52 is formed. The tire mounting device rotates the bead guide 50, thereby being capable of selectively switching the rotary position of the bead guide 50 between the first position at which the guide plate 52 is retreated from the outer circumferential end of the wheel H radially inwardly of the wheel, and the second position at which the guide plate 52 protrudes from the outer circumferential end of the wheel H radially outwardly of the wheel. Accordingly, the rotary position of the bead guide 50 is switched from the first position to the second position at such a position that the upper bead TBU is located above the outer-circumferential-side upper surface of the wheel H. In this manner, the guide plate 52 can be caused to reliably enter below the upper bead TBU. From this state, the bead guide 50 and the roller 62 are caused to circle in the circumferential direction of the wheel H, thereby causing the upper bead TBU to fall into the rim R while the upper bead TBU slides on the upper surface of the guide plate 52. Therefore, even when the step S is formed by a spoke or the like on the outer-circumferential-side upper surface of the wheel H, the upper bead TBU can be fitted onto the rim R without being caught by the step. As a result, damage of the upper bead TBU can be prevented.

Further, after fitting the upper bead TBU onto the rim R, the rotary position of the bead guide 50 is switched from the second position back to the first position. Thus, the guide plate 52 does not lift up the upper bead TBU that has been already fitted onto the rim R. Further, while the bead guide 50 circles, the rotary position of the bead guide 50 can be switched from the second position to the first position, with the result that the mounting of the tire can be finished in a short period of time.

Further, when the rotary position of the bead guide 50 is switched from the first position to the second position, the bead guide 50 is rotated in the direction reverse to the circling direction of the bead guide 50. Thus, the guide plate 52 can be caused to enter the gap between the outer-circumferential-side upper surface of the wheel H and the upper bead TBU from the wide side to a narrow side of the gap. In addition, the guide plate 52 extends from the distal end of the columnar portion 51 radially outward to be curved in an arc shape, and the guide plate 52 extends in the same direction (direction of forming the arc shape) as the direction of rotating the bead guide 50 when the bead guide 50 is switched from the first position to the second position. Accordingly, when the bead guide 50 is switched from the first position to the second position, the distal end extending in an arc shape of the guide plate 52 can be caused to enter the gap between the outer-circumferential-side upper surface of the wheel H and the upper bead TBU. As a result, the guide plate 52 can be caused to smoothly enter the above-mentioned gap, and the guide plate 52 can be reliably arranged below the upper bead TBU. Further, when the bead guide 50 is switched from the first position to the second position, the tire lift driving section 86 is operated to temporarily lift up the tire T, thereby increasing a vertical distance between the outer-circumferential-side upper surface of the wheel H and the upper bead TBU. Thus, the guide plate 52 can be caused to further reliably enter the gap between the outer-circumferential-side upper surface of the wheel H and the upper bead TBU.

Further, irrespective of the rotary position of the bead guide 50, the inclination of the guide-portion bottom surface 53 is set so that the height of the guide-portion bottom surface 53 is increased toward the radial center of the wheel H. Accordingly, even when the outer-circumferential-side upper surface of the wheel H swells radially toward the center of the wheel H, the bead guide 50 can be prevented from interfering with the swelling portion.

The tire mounting device according to this embodiment is described above. However, the present invention is not limited to the above-mentioned embodiment, and various modifications may be adopted within the scope of the present invention.

Figure 12:
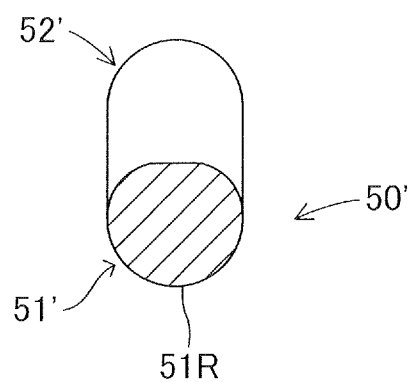
FIG. 12 is a partial sectional plan view for illustrating a bead guide according to a modified example.

For example, in this embodiment, the guide plate 52 is formed to extend into a curved arc shape, but it is not always necessary to form the guide plate 52 into the above-mentioned shape. As illustrated in FIG. 12, for example, a bead guide 50' including an oval guide plate 52' may be adopted. Also in this case, it is preferred that the guide plate 52' be switched from the first position to the second position in a direction reverse to a circling direction of the bead guide 50'. Further, in this embodiment, the entire circumference of the side surface of the columnar portion 51 is formed into a cylindrical surface, but a part of the side surface may be formed into a cylindrical surface. For example, as illustrated in FIG. 12, there may be adopted a columnar portion 51' in which only a part of its side surface is formed into a cylindrical surface. Further, the cylindrical side surface does not need to have a round cross-section, but only needs to have a smooth curved surface. Further, in this embodiment, the guide plate 52 and the columnar portion 51' are formed integrally with each other. Separate components may be prepared as the guide plate 52 and the columnar portion 51', and joined and formed integrally with each other.

Further, in this embodiment, the arm back-and-forth movement driving section 31 can shift the radial positions of the bead guide 50 and the roller 62 with respect to the wheel. For example, a tire mounting device dedicated to a specific wheel diameter does not always need to include the mechanism for shifting the radial positions of the bead guide 50 and the roller 62.

Further, in this embodiment, when the rotary position of the bead guide 50 is switched from the first position to the second position, the tire lift driving section 86 is operated, but there may be adopted a configuration in which the tire lift driving section 86 is omitted. Even with this configuration, owing to the rotation of the guide plate 52, the guide plate 52 can be caused to satisfactorily enter below the upper bead TBU.

Further, at the start of the tire mounting step, the wheel diameter and the wheel width of the wheel H with a temporarily-engaging tire may be detected by sensors, respectively, and the arm back-and-forth movement driving section 31 and the unit ascent-descent driving section 80 may be controlled to arrange the bead guide 50 and the roller 62 at positions depending on the detection values.

The invention claimed is:

1. A tire mounting device, wherein the tire mounting device comprises:
 a table for temporarily fixing a wheel such that a center of the wheel is positioned on a center axis of the tire mounting device,
 a bead guide positioned at a radial position for circling a circumference at a predetermined distance from the center axis of the tire mounting device, the bead guide configured for pushing an inner circumferential end of a bead of a tire radially outwardly of the wheel while the bead guide circles about a center axis of the wheel under a state in which the tire is temporarily engaged on the wheel, and
 a roller for pressing the bead of the tire from above the tire while the roller circles about the center axis of the wheel to follow the bead guide; and
 the bead guide includes:
  a columnar portion having a cylindrical side surface; and
  a plate-like guide plate having an outer circumferential end and extending from a distal end of the columnar portion radially outwardly of the columnar portion, the bead guide is arranged at a position at which a bottom surface of the bead guide is opposed to an outer-circumferential-side upper surface of the wheel with a vertical space between the bottom surface and the outer-circumferential-side upper surface of the wheel;
 the tire mounting device further comprises a bead guide rotary position driving mechanism for selectively switching, by rotating the guide plate about the columnar portion, between a first position at which the outer circumferential end of the guide plate is retreated such that the entirety of the guide plate is positioned radially inwardly of the circumference at the predetermined distance from the center axis of the tire mounting device, and a second position at which at least a portion of the guide plate extends beyond the columnar portion and is positioned radially outwardly of the columnar portion and the circumference at the predetermined distance from the center axis of the tire mounting device, wherein the columnar portion maintains a constant radical distance from the center axis while the guide plate is moved between the first and second positions, and
 the bead guide is switched from the first position to the second position so that the outer circumferential end of the guide plate is caused to enter below the bead of the tire.

2. A tire mounting device according to claim 1, wherein when the bead guide is rotated to the first position, a portion of the cylindrical side surface of the columnar portion protrudes radially outwardly from the circumference at the predetermined distance from the center axis of the tire mounting device such that a lower bead, which is the bead located in a lower portion of the tire temporarily engaged on the wheel, is mounted to a rim of the wheel by the portion of the cylindrical side surface as the bead guide is caused to circle about the center axis of the wheel under a state in which the bead guide is set at the first position, and
 when the bead guide is rotated to the second position, an upper bead, which is the bead located in an upper portion of the tire temporarily engaged on the wheel, is mounted to the rim of the wheel by the outer circumferential end of the guide plate, which is positioned below the upper bead, and the cylindrical side surface of the columnar portion radially pressing and the roller axially pressing the upper bead as the bead guide is caused to circle about the center axis of the wheel under a state in which the bead guide is set at the second position.

3. A tire mounting device according to claim 1, wherein when the bead guide rotary position driving mechanism switches the bead guide from the first position to the second position, the bead guide rotary position driving mechanism rotates the bead guide about an axis of the columnar portion in a direction reverse to a circling direction of the bead guide.

4. A tire mounting device according to claim 3, wherein the outer circumferential end of the guide plate is formed to extend in an arc shape from the distal end of the columnar portion radially outwardly of the columnar portion, and the outer circumferential end of the guide plate extends in the arc shape in the same direction as a direction of rotating the bead guide portion when the bead guide is switched from the first position to the second position.

5. A tire mounting device according to claim 1, wherein the tire mounting device further comprises tire lifting means for lifting the tire to increase the vertical space between the outer-circumferential-side upper surface of the wheel and the bead of the tire when the bead guide rotary position driving mechanism switches the bead guide from the first position to the second position.

6. A tire mounting device according to claim 1, wherein the bottom surface of the bead guide is inclined so that a height of the bottom surface is increased as the bottom surface approaches the center of the wheel irrespective of a rotary position of the bead guide.

\* \* \* \* \*